COLOR TELEVISION APPARATUS AND CIRCUITS THEREFOR

Filed June 20, 1951 3 Sheets-Sheet 1

INVENTOR.
JOHN L. RENNICK
BY Francis W. Crotty
HIS ATTORNEY.

INVENTOR.
JOHN L. RENNICK
BY Francis W. Crotty
HIS ATTORNEY.

April 27, 1965 J. L. RENNICK 3,180,928

COLOR TELEVISION APPARATUS AND CIRCUITS THEREFOR

Filed June 20, 1951 3 Sheets-Sheet 3

INVENTOR.
JOHN L. RENNICK
BY Francis W. Crotty
HIS ATTORNEY.

United States Patent Office 3,180,928
Patented Apr. 27, 1965

3,180,928
COLOR TELEVISION APPARATUS AND CIRCUITS THEREFOR

John L. Rennick, Elmwood Park, Ill., assignor to Zenith Radio Corporation, a corporation of Delaware
Filed June 20, 1951, Ser. No. 232,559
23 Claims. (Cl. 178—5.4)

This application is a continuation-in-part of copending application in the name of John L. Rennick, Serial Number 215,761, filed March 15, 1951, now Patent No. 3,133,148, issued May 12, 1964, and assigned to the present assignee.

The invention relates to television apparatus and more particularly to color television receivers, signal translating circuits for use in such receivers, and matrixing apparatus for color television signals.

One of the major problems which has impeded the advance of color television has been that of realizing color fidelity in the overall transmitting and receiving apparatus while limiting the frequency spectrum utilized for the transmission of such information to channels no wider than those now used for conventional monochromatic transmission. Among the proposed methods for realizing high fidelity despite limited band width are the mixed highs system disclosed in "Electronics Magazine" for December, 1950, at page 122; the dot-interlace system described in the "RCA Review" for June 1950, at pages 255 to 286; and the frequency interlace system described in the December 1950 issue of "Electronics Magazine" at page 70.

While these prior approaches to the problem of color television may be satisfactory, at least from a theoretical view point, they are relatively complex and impose undue complications in the system circuitry, especially at the receiver.

It has been suggested in the literature and confirmed by experiment that the human eye is much less critical of lack of color detail than it is of lack of black-white or brightness detail. It is essential, therefore, that the brightness information of a televised scene be transmitted with utmost fidelity. This requirement is not easily satisfied in certain prior color television systems which, consequently, are subject to some inherent disadvantages.

Consider, for example, the well-known simultaneous method of color telecasting wherein three signals are transmitted concurrently, each representing an assigned one of the primary-color fields of the image and being video modulated in accordance with the entire brightness and saturation information of its particular field. If any of these signals becomes delayed in phase or unduly reduced in amplitude relative to the others, as may be occasioned by differences in the propagation characteristics of the several signal channels, a material loss in detail may be experienced in the reproduced image. This loss results from a loss in black-white or brightness detail rather than any deficiency in color hue and saturation information, as distinguished from brightness information. Difficulties of this type may be expected in any such system employing a plurality of color-component signals video modulated with the full range of brightness information and effectively transmitted at different frequencies. It is desirable to prevent such loss of detail while retaining fidelity and relatively simple circuitry.

Furthermore, most prior art systems have considered essential the transmission of three color signals in any three-color television system. It is clear that a reduction in the number of color signals transmitted results in apparatus and spectrum economies.

In a color system employing frequency interlace wherein the frequency components of two or more signals, which represent color information, are transmitted in interleaving relation with the components of a video signal, the color signals must be individually regained at the receiver. Usually a form of analyzer is employed for this purpose, but the color signals so derived are generally contaminated by common spurious signals. The contamination may adversely affect the reproduced images in that accurate color reproduction is not attainable. Hence, in some applications, it may be desirable to reduce the magnitude of or entirely remove the spurious signal components.

Accordingly, it is an object of this invention to provide a simplified color television system which has high fidelity performance while requiring only the conventional channel widths to realize such fidelity.

It is a still further object of this invention to provide receiver apparatus and circuitry which will establish and maintain proper phase and amplitude relationships between the received signals representing the colors in a transmitted image.

Yet another object of the invention is to provide a color television receiver that is improved by the inclusion of a novel circuit for materially reducing contamination by common spurious signals of individual signals which together represent color information.

It is a further object of the invention to provide new and improved matrixing apparatus for color television signals which, when used in a color television receiver, results in a very substantial simplification of the receiver circuitry.

Yet another object of the invention is to provide novel signal translating circuitry for use in a color television receiver which permits tri-color image reproduction when only a pair of color-representative signals are received.

In accordance with one feature of the invention a color television receiver for utilizing a plurality of control signals, collectively defining hue and color saturation of an image to be reproduced, comprises at least three electron-discharge devices which individually include a cathode, an anode and a control electrode. A common cathode load impedance connects each of the cathodes of the devices with a plane of fixed reference potential. Means are provided for applying the aforesaid control signals between different ones of the control electrodes of said devices and the plane of fixed reference potential. The receiver further includes individual anode-load impedances for the electron-discharge devices and image-reproducing means are coupled to the last-mentioned impedances.

In accordance with another feature of the invention, new and improved matrixing apparatus for color television signals comprises means for supplying a pair of signals individually representative of unlike colors of an image, and a plurality of electron-discharge devices each having at least a cathode, an anode, and a control electrode. Means are provided for applying the pair of signals individually to different ones of the control electrodes of the electron-discharge devices. Means, including an impedance network cross-coupling the cathodes of the electron-discharge devices, are provided for developing from predetermined proportions of the applied signals at one of the cathodes another signal representative of another color. A plurality of output circuits are individually coupled to different ones of the anodes for developing in the output circuits output signals individually representative of different ones of three unlike colors of the image.

In accordance with still another feature of the invention, a new and improved color television receiver adapted to utilize first and second color-representative signals representative of different predetermined color components of an image comprises an active electron device having an input electrode, an output electrode and a common electrode. First and second output loads are coupled respectively to the output electrode and to the common electrode and are adapted to develop output signals of different polarities in response to application of an input signal to the input electrode. Means are provided for applying the first color-representative signal to the input electrode to develop color-representative signals of different polarities in the first and second output loads respectively. Means are also provided for generating an additional color-representative signal representative of a color component of the image different than either of the predetermined color components, the generating means comprising means for applying the second color-representative signal to the second output load for combination with the color-representative signal developed therein in response to application of the first color-representative signal to the input electrode.

In accordance with yet another feature of the invention, a color television receiver, adapted to utilize a luminance signal representative of the brightness of an image and first and second color difference signals representative of different predetermined color components of the image and each having a brightness component, comprises first and second amplifiers each having an independent output load and an input circuit and both having a common output load. Means are provided for applying the first and second color difference signals to the input circuits of the first and second amplifiers respectively. A third amplifier is also provided having an independent output load and having an input circuit coupled to the common output load of the first and second amplifiers. Means are provided for applying the luminance signal to the first, second and third amplifiers to matrix therein with the color difference signals developed thereby in response to the application of the first and second color difference signals to the first and second amplifiers and to develop in the independent output circuits of the first, second and third amplifiers respectively three different color-representative signals, each of which is different than either of the first and second color difference signals and at least one of which is representative of a different color component of the image than the predetermined color components.

For a better understanding of the invention together with other and further objects thereof, reference is made to the following description taken in connection with the accompanying drawings in which.

Figure 1:
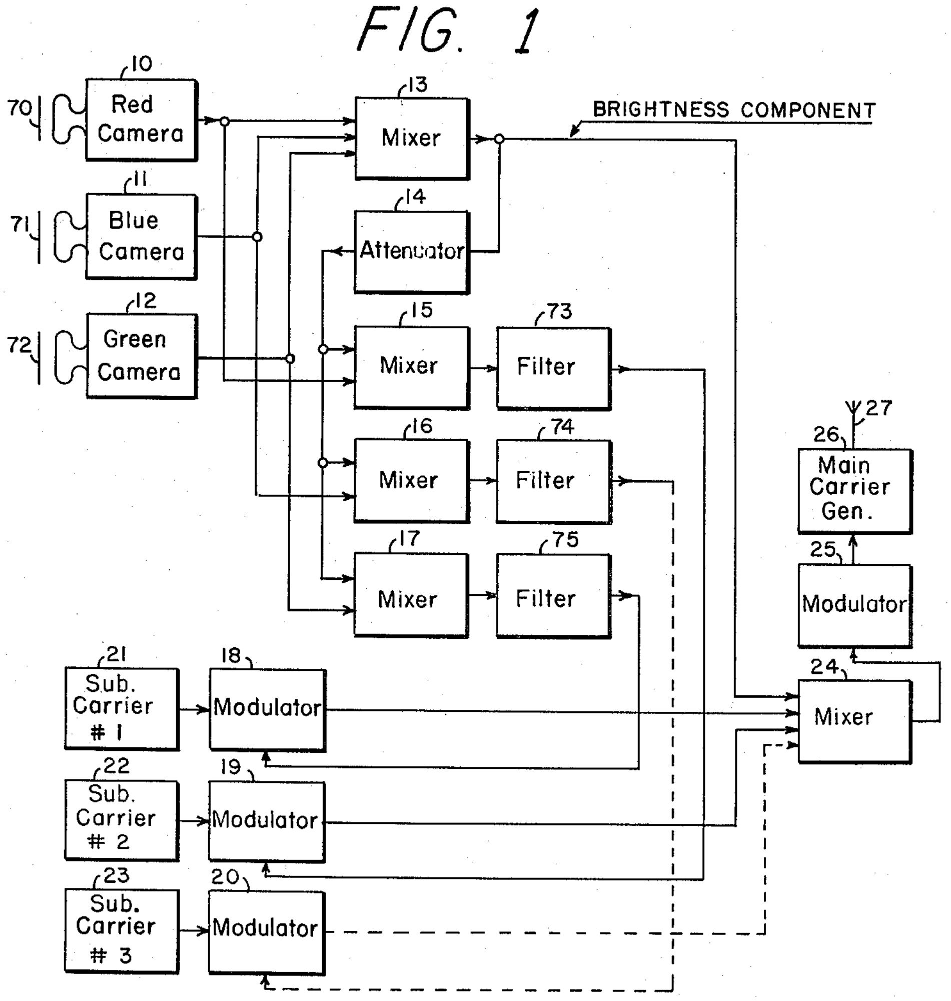
FIGURE 1 is a block diagram of a color-television transmitter.

In FIGURE 1, video-frequency signal components are generated by three pick-up camera devices 10, 11 and 12 operating simultaneously, but individually developing video information corresponding to an assigned color field of the image being televised. To that end, filters 70, 71 and 72 may be interposed between the cameras and their common object so that the devices 10, 11 and 12 are influenced, respectively, by the red, blue and green color fields of the object. The line and field scanning functions of the cameras are carried on in synchronism and in phase, in the manner of conventional simultaneous color transmission and under the control of a common scanning-signal generating system or individual scanning generators and a common master timer, all of which have been omitted from the drawing since they are well-known and, per se, constitute no part of the instant invention.

The video signals from the red, blue and green color cameras 10, 11 and 12, respectively, are fed to a common mixer 13 which produces in its output circuit a brightness or monochrome signal. This mixer circuit may be a conventional one, consisting of three triode vacuum tubes with their anode elements connected in parallel and coupled to a common impedance and with their grid elements respectively connected to the output circuits of the red, blue and green cameras. The cathode circuits of these triodes may contain unbypassed resistors of large values so that substantially unity gain is obtained in each of the tubes. The output signal from mixer 13 has an amplitude which is a summation of the individual amplitudes of the signals from cameras 10, 11 and 12 but is of inverted phase. This output signal is attenuated in attenuator 14 to one-third its value and fed through three branches to the input circuits of three mixers 15, 16 and 17 where it is added to the red, blue and green camera signals, respectively. The output signals from mixers 15, 16 and 17 constitute the red control signal, the blue control signal and the green control signal, respectively.

These color-control signals represent the hue and saturation of the scanned image, but not its brightness. Since the color-control signals individually represent the amplitude difference between respective ones of the primary color signals and a portion of the brightness signal, they appropriately may be termed "color-difference signals." The term "color-representative signals" is employed to designate generically any signal, such as a color difference signal or a pure color signal, which is representative of a color component of the image.

The output signals from mixers 15, 16 and 17 may be applied to conventional amplitude modulators 18, 19 and 20 with which there are associated subcarrier generators 21, 22 and 23, respectivley. The frequencies of operation of the subcarrier generators are different from one another and each is an odd multiple of one-half the line scanning frequency of the television system. The full brightness signal from mixer 13 is supplied to mixer 24 which also receives the modulated subcarrier signals from generators 21, 22 and 23. Once again, mixer 24 is a simple adder circuit and its output drives a further modulator 25 which amplitude modulates the main carrier signal supplied by a generator 26. This main carrier generator, which may also be termed the transmitter, may be coupled to an appropriate antenna or other wave disseminating apparatus 27. In this system, the brightness or luminance signal constitutes the direct intelligence modulation on the transmitted carrier and the color-control signals appear as modulated subcarriers on the main signal. The luminance signal may be represented by the symbol Y, and the color-control or color difference signals by the designations $R-Y$, $B-Y$ and $G-Y$.

Of course, it is preferable to include the usual blanking, equalizing and synchronizing components, both line and field, in the transmitted signal and that may be accomplished by supplying such additional components to mixer 24 along with the brightness components from mixer 13. Any well-known generating unit may be included in the transmitter as a source of such additional components but since that generator is no part of the present invention, it has not been illustrated. Likewise, any known technique may be employed for transmitting the sound information accompanying the video program.

The choice of the sub-carrier frequencies is important for, by appropriate selection of these frequencies, the color-control signals may be sandwiched within or effectively interlaced with signal component groupings of the brightness signal. As has been known for many years, the spectrum of a pulse modulated carrier wave contains regions of high energy and regions of very low energy with the latter occurring at odd multiples of one-half the pulse repetition rate.

As applied to television transmission, this principle means that the video content is bunched in frequency groups spaced by the line-scanning frequency and having relative signal voids therebetween. It is evident that the sub-carrier frequencies may be chosen to cause the color-control signals to fall within such voids so that the bandwidth of the transmission does not exceed the 4 megacycle width established as the effective band for commercial television broadcasts.

The use of this type of "frequency interlace" for the color signals themselves as distinguished from the color-control signals of the present invention, is described by R. B. Dome in his article in the September 1950, issue of "Electronics Magazine."

It is not necessary to transmit all three color-control signals in a three-color television system. It is sufficient to transmit two color-control signals and the brightness or monochrome signal. The color-control signals derived at the output circuits of mixers 15, 16 and 17, respectively, are collectively free from brightness information, a fact that may be shown mathematically, as follows:

Let:

Red camera signal$=R$
Green camera signal$=G$
Blue camera signal$=B$
Brightness$=W$
Red color-control signal$=R'$
Green color-control signal$=G'$
Blue color-control signal$=B'$ $$W=R+B+G \quad (1)$$

$$R'=R-\tfrac{1}{3}W \quad (2)$$

$$G'=G-\tfrac{1}{3}W \quad (3)$$

$$B'=B-\tfrac{1}{3}W \quad (4)$$

$$R'+G'+B'=R+G+B-\frac{3W}{3}=0 \quad (5)$$

Hence, there is no brightness or monochrome information in the derived color-control signals, and furthermore, it is evident that these signals are not independent variables for, $$B'=-(R'+G') \quad (6)$$

Thus, in the transmitter of FIGURE 1, sub-carrier generator 23, its associated modulator 20 and its connection to mixer 24 may be eliminated and the blue color-control signal with which it was modulated may be synthesized at the receiver. The other two sub-carriers supplied by generators 21 and 22 may, in the standard 4 megacycle system, be located at 3.583 megacycles and 3.898 megacycles. The bandwidth allotted to each color-control signal may be very small compared with that of the brightness or monochrome signal and may, for example, be limited to two-tenths megacycles in the low frequency end of the video spectrum by filters 73, 74 and 75 because the detail of the reproduced image is not dependent upon the detail of the control signal but, rather, is determined by the detail of the monochrome signal.

Figure 2:
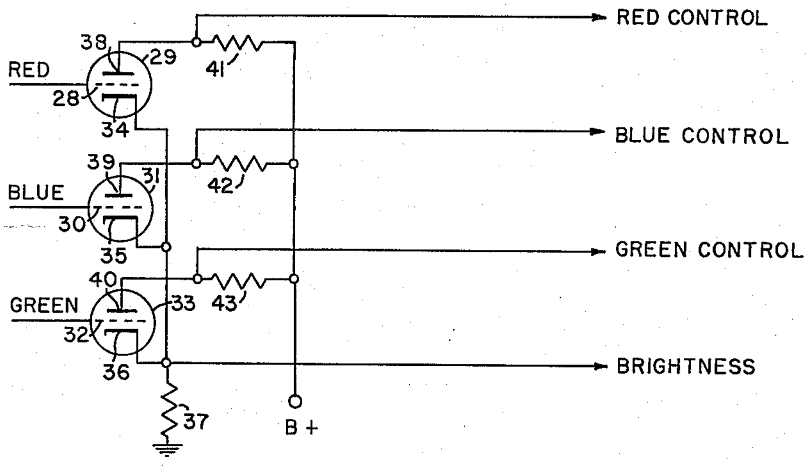
FIGURE 2 is a circuit diagram of a color-control signal generator for use at the transmitter.

In FIGURE 2 a circuit is shown which may replace mixers 13, 15, 16 and 17 and attenuator 14 of FIGURE 1. Its operation is as follows:

Video signals from the red camera are applied to grid 28 of a first vacuum tube 29. The video signals from the blue camera are applied to grid 30 of another vacuum tube 31 and video signals from the green camera are applied to grid 32 of still another vacuum tube 33. Cathodes 34, 35 and 36 of vacuum tubes 29, 31 and 33, respectively, are connected to a common cathode load resistor 37 which, in turn, is connected to a ground potential point. The magnitude of resistor 37 is large with respect to the inverse of the transconductance of vacuum tubes 29, 31 and 33, which have substantially identical characteristics. The anodes 38, 39 and 40 are connected through their respective load resistors 41, 42 and 43 to a common source of unidirectional potential indicated as B+. A red control signal, having a value equal to the red camera signal minus one-third the brightness signal, is automatically obtained at anode 38 of vacuum tube 29. Correspondingly, blue and green color-control signals may be obtained from anodes 39 and 40 of vacuum tubes 31 and 33, respectively. The brightness or monochrome signal, which is the sum of the camera signals, is obtained from the common connection of cathodes 34, 35 and 36. That the control signals are, in fact, the respective camera signals minus one-third of the brightness signal, and thus are collectively free of brightness information, may best be shown by the following mathematical analysis:

Let:

$r_k$=value of resistor 37
$M$=mutual conductance of tubes 29, 31 and 33
$K$=voltage across resistor 37
$i_R$, $i_B$, $i_G$=space current in vacuum tubes 29, 31 and 33, respectively
$r_p$=value of plate resistors 41, 42 and 43
$E_R$, $E_B$, $E_G$=grid-cathode voltage in vacuum tubes 29, 31 and 33, respectively.

Then, referring to Equations 1–6 appearing earlier herein:

$$i_R=ME_R \quad (7)$$

$$i_G=ME_G \quad (8)$$

$$i_B=ME_B \quad (9)$$

$$K=M(E_R+E_G+E_B)r_k \quad (10)$$

$$E_R=R-K \quad (11)$$

$$E_G=G-K \quad (12)$$

$$E_B=B-K \quad (13)$$

$$K=M[(R-K)+(G-K)+(B-K)]r_k \quad (14)$$

$$K=Mr_k(R+G+B)-3Mr_kK \quad (15)$$

$$K=Mr_kW-3Mr_kK \quad (16)$$

$$K(1+3Mr_k)=Mr_kW \quad (17)$$

$$K=\frac{W}{\frac{1}{Mr_k}+3} \quad (18)$$

If $$r_k \gg \frac{1}{M}, Mr_k \gg 1 \quad (19)$$

and $$K=\frac{W}{3}=\frac{1}{3} \quad (20)$$

Brightness. Further:

$$i_R=ME_R \quad (21)$$

$$i_R=M(R-K)=M\left(R-\frac{W}{3}\right)=MR' \quad (22)$$

Load voltage across $r_p41=i_Rr_p=Mr_pR'$
=constant (Red control signal) (23)

It can be shown that the blue and green control signals are similarly derived automatically from the circuit. By adding all the control signals together, it will be found that their sum is a constant times zero which is the necessary condition for color-control signals collectively free of monochrome information. Furthermore, and as in the arrangement of FIGURE 1, the color-control signals generated automatically with this circuit are related so that only two need be transmitted along with the brightness or monochrome signal, these two being employed to synthesize the third color-control signal at the receiver. It will be observed from Equation 20 that the luminance signal transmitted by the system of FIGURE 1, as modified in accordance with FIGURE 2, is $W/3$ in terms of the relationship expressed in Equation 1. In general, the luminance signal may be represented by the symbol Y and the color difference signals by the symbols $R-Y$, $B-Y$ and $G-Y$ regardless of the particular weighting assigned in relation to the primary color signals, R, B and G.

Figure 3:
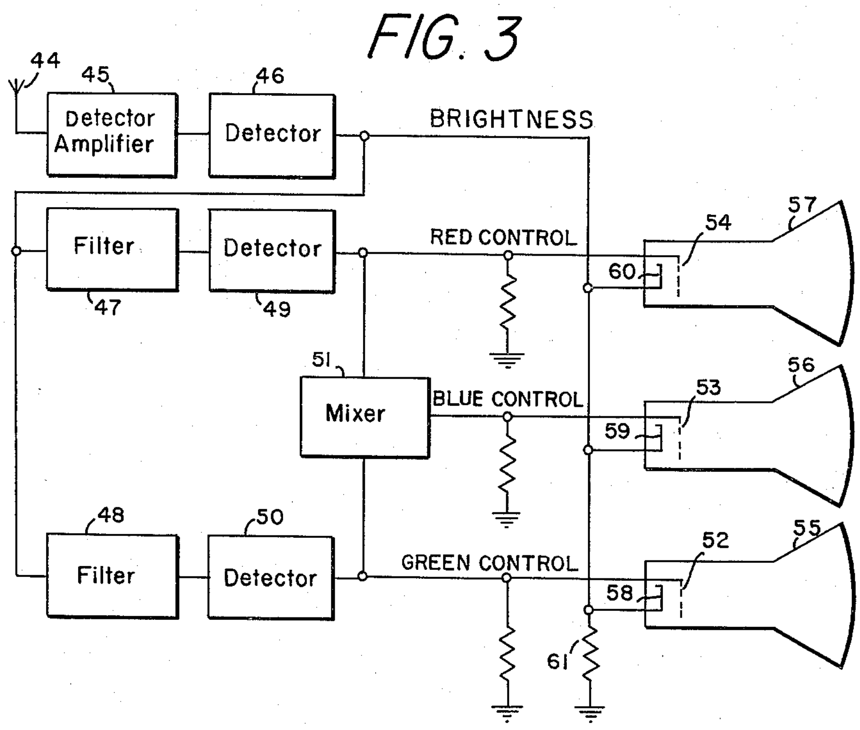
FIGURE 3 is a block diagram of a color-television receiver.

In FIGURE 3, the signal disseminated by the transmitter of FIGURE 1 is picked up on antenna 44 and is appropriately heterodyned and amplified at intermediate frequency in a detector-amplifier 45 and is then passed to a video detector 46 which develops a composite color video signal from which the brightness information components are obtained directly. By means of appropriate band-pass filters 47 and 48 coupled to signal detector 46, the sub-carrier signals modulated with the color-control information are selected from the composite color video signal and supplied to respective detectors or demodulators 49 and 50 wherein a pair of color-control signals are obtained. If three color-control signals are transmitted, although that is unnecesasry, a third tuned filter and detector may be provided to demodulate its carrier and obtain the third color-control signal.

For the case under consideration, in which only two color-control signals are transmitted, it will be assumed that the output signal from detector 49 is the red color-control signal R′ and the output from detector 50 is the green-control signal G′. The blue color-control signal B′ may be obtained from a mixer 51 having an input circuit connected to both detectors 49 and 50 for, as has already been indicated in Equation 6, this control signal is related to and obtainable from the other two. This mixer may comprise a pair of triode vacuum tubes having their anodes connected to a common load resistor and their grids connected, respectively, to the output circuits of detectors 49 and 50. The negative sign of Equation 6 is automatically effected by the inversion inherent in the mixer stage. These green, blue and red color-control signals, which collectively represent the hue and saturation of the colors in the scanned image, may then be applied to the control grids 52, 53 and 54, respectively, of the electron guns in cathode-ray tubes 55, 56 and 57. Cathodes 58, 59 and 60 of the three cathode-ray tubes are connected together and to the output of detector 46 and are connected to ground through a common cathode impedance, such as a resistor 61.

As a result, the brightness or luminance signal is applied to the three cathodes in parallel, whereas the color-control or color difference signals are supplied individually one to each control grid of the three cathode-ray tubes. Alternatively, the brightness signal may be applied to the three grids in parallel and the control signals may be applied to respective cathodes, but due regard must be given to polarity. In either case, additive modulation of the beam from each gun is effected. Appropriate scanning, focusing and accelerating potentials are applied to the cathode-ray tubes for operation thereof.

The appropriate primary color filter may be provided for each cathode-ray tube, and the image on each tube may be superimposed on that from each other tube through an appropriate optical system in well known fashion.

A single three-gun cathode-ray tube of the type described at page 34 of the "Tele-Tech Magazine" for July 1950 may replace the three separate single gun tubes, in which case the color filters and optical system are not required.

The receiver of FIGURE 3 may be provided with conventional synchronization signal separators, sweep circuits, sound detector and reproducing apparatus, and power supplies, all of which are well known in the art and do not form a part of this invention, and hence are not shown.

It is apparent from the foregoing description that a system and apparatus have been provided which are greatly simplified over existing color-television systems and apparatus. Furthermore, this apparatus makes certain the transmission of the brightness or monochrome information, which is essential to good detail in the reproduced picture, with optimum efficiency and eliminates all such brightness information from the color control signals which may be transmitted on different nominal frequencies. These collective color-control signals, being free of brightness information, represent color hue and saturation only. In addition, apparatus has been provided at the transmitter which simply and automatically generates such control signals and brightness signals that only two color-control signals and the brightness signal need be transmitted, the third color-control signal being synthesized in a simple fashion at the receiver. Certain aspects of the disclosed system are claimed in the above-identified Patent No. 3,133,148.

Although the concept of separating a brightness signal from color-control signals has been shown herein in connection with a frequency interlace type of color system it is equally adaptable to a straight simultaneous color system or to a dot-interlace color system. In the latter case the color-control signals are sampled and placed on the carrier which has been modulated with the brightness information. Appropriate desampling apparatus is then provided at the receiver so that the color-control signals which are transmitted are reconstituted, and if only two such signals are transmitted they may be used to synthesize the remaining color-control signal.

As explained above, the television signal intercepted by the receiver of FIGURE 3 contains color-control signal components interlaced with the components of the brightness signal. The several groups of components representing the color-control signals occupy individual but narrow frequency bands within the video-frequency spectrum and are derived by means of band-pass filters 47 and 48. Since it is not feasible completely to separate the interlaced color-control signals by means of conventional filters, the regained control signals may be contaminated with brightness information. This may not be objectionable in certain installations and acceptable color images may be reproduced.

Figures 4, 5, 6:
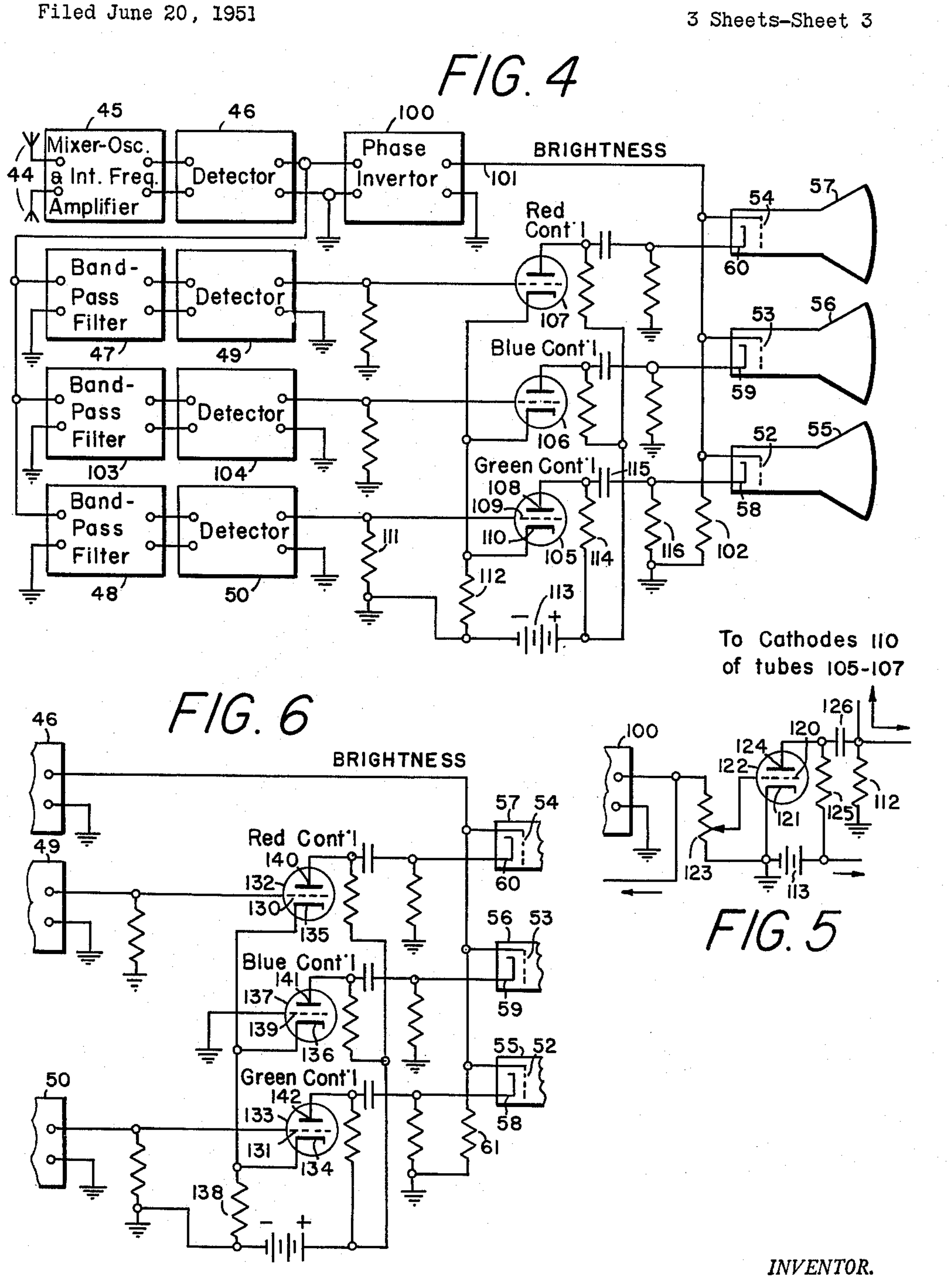
FIGURE 4 is a schematic diagram, partly in block form, of a complete color television receiver in accordance with the invention.
FIGURES 5 and 6 represent different embodiments of the invention which may be incorporated in the receiver of FIGURE 4.

However, it is desirable to reduce such contamination, and the color television receiver illustrated in FIGURE 4 embodies a novel circuit arrangement for that purpose. This receiver includes certain elements similar in every respect to corresponding portions of the receiver represented in FIGURE 3 and, for convenience, they are identified by the same reference numerals. The brightness channel includes a phase inverter 100 coupled to the output circuit of detector 46 and having its output coupled via a lead 101 to the control electrodes 52–54 of picture tubes 55–57. The control electrodes are connected in parallel and are grounded through a resistor 102.

In addition to the red and green control-signal channels 47, 49 and 48, 50 a blue channel, including a band-pass filter 103 and a detector 104, is coupled to the output circuit of detector 46. Each of the filters 47, 48 and 103 is selective to a frequency band of the composite color video signal containing an associated group of frequency components representing one of the red, green and blue control signals. Each of the color-control signal channels is coupled to the cathode of one of the picture tubes 55–57 through individual signal-translating stages which are identical in construction and include three active electron devices, here shown as electron-discharge tubes 105–107. Since these stages are alike in every respect, a description of one, i.e. that for the green-control signal, suffices for the others.

Electron tube 105 has an output electrode or anode 108, a common electrode or cathode 110 and an input electrode or control grid 109 grounded through a grid resistor 111 and connected to one output terminal of detector 50. Appropriate ground connections complete a coupling circuit between the detector and tube 105. Cathode 110, as well as the cathodes of tubes 106 and 107, is grounded through a common output load resistor 112 which, together with its connecting leads, constitutes an impedance network cross coupling the cathodes of tubes 105–107 and which has a resistance value much greater than the inverse of the grid-anode transconductance of tubes 105–107. Operating potential for anode 108 is supplied by a source 113, connected in series with an anode output load resistor 114, and a coupling circuit comprising a condenser 115 and a resistor 116 is interposed between the anode 108 and cathode 58 of picture tube 55.

In operation the green, blue and red color-control signals from detectors 50, 104 and 49 are individually supplied to tubes 105–107 and are thereafter applied to the cathodes of picture tubes 55–57 to modulate each electron beam in accordance with one of the color-control signals. At the same time, the brightness or luminance signal from inverter 100 produces like beam modulation in the picture tubes, and images in natural color are reproduced in a manner similar to that described in connection with FIGURE 3.

As pointed out hereinbefore, the output signals from detectors 49, 104 and 50 may include, in addition to the red (R'), blue (B'), and green (G') control-signal components, a spurious or contamination signal (C) common to the three channels and hence $$\left.\begin{aligned} R'+C &= \text{input to tube } \mathbf{107} \\ B'+C &= \text{input to tube } \mathbf{106} \\ G'+C &= \text{input to tube } \mathbf{105} \end{aligned}\right\} \quad (24)$$

If $r_k$ represents resistor 112, K the voltage across that resistor, M the grid-plate transconductance of tubes 105–107 and $E_R$, $E_G$ and $E_B$ the grid-to-cathode voltages of tubes 105–107, then $$K=Mr_k(E_R+E_G+E_B) \quad (25)$$

The grid-to-cathode potential of each tube is the difference of the grid-to-ground and cathode-to-ground potentials so that $$\left.\begin{aligned} E_R &= R'+C-K \\ E_G &= G'+C-K \\ E_B &= B'+C-K \end{aligned}\right\} \quad (26)$$

Substituting the values of the grid-to-cathode potentials of Equations 26 into Equation 25 it becomes $$K=Mr_k(R'+C-K+G'+C-K+B'+C-K)$$

or $$K=Mr_k(R'+G'+B')+3Mr_k(C-K) \quad (27)$$

From Equation 5

$$R'+G'+B'=0$$

so Equation 27 may be expressed as $$K=3Mr_kC-3Mr_kK$$

or $$K=\frac{C}{(⅓Mr_k)+1} \quad (28)$$

$r_K$ is very much larger than $1/M$, the first term in the denominator of Equation 28 becomes zero, and $$K=C \quad (29)$$

The anode currents in each of tubes 105–107 are defined as $$\left.\begin{aligned} i_R &= ME_R \\ i_B &= ME_B \\ i_G &= ME_G \end{aligned}\right\} \quad (30)$$

which may be expressed in terms of Equations 26 as $$\left.\begin{aligned} i_R &= M(R'+C-K) \\ i_B &= M(B'+C-K) \\ i_G &= M(G'+C-K) \end{aligned}\right\} \quad (31)$$

Employing the relationship of Equation 27 in each of Equations 31 it is apparent that $$\left.\begin{aligned} i_R &= MR' \\ i_B &= MB' \\ i_G &= MG' \end{aligned}\right\} \quad (32)$$

and the contamination signal, that is common to the three channels, does not appear in the output signals of tubes 105–107.

The function of tubes 105–107 may be performed by the picture tubes themselves in a circuit like the one illustrated in FIGURE 3 if the common cathode resistor 61 for picture tubes 55–57 has a resistance value much greater than the reciprocal of the mutual conductance of the picture tubes. The same analysis presented in connection with FIGURE 4 is applicable and the terms ($i_R$), ($i_B$) and ($i_G$) of Equation 32 then represent the respective picture tube electron-beam currents. As in the receiver of FIGURE 4, the contamination signal (C) is eliminated.

It is appropriate to point out that insofar as the beam current in each of picture tubes 55–57 is concerned the quantity $W/3$ [see Equations 2–5] is added to each of the control signals. This effectively reproduces the camera signals of the transmitter at the receiver. The circuit of FIGURE 4 may be modified so that this matrixing action occurs in tubes 105–107 by including the circuit of FIGURE 5. Connection 101, which extends from inverter 100 to the picture tubes, is broken and control electrodes 52–54 are grounded. Inverter 100 is coupled between control grid 120 and cathode 121 of an electron tube 122 via a potentiometer 123. Anode 124 of tube 122 is connected to B-supply source 113 through an anode or load resistor 125 and to the ungrounded end of resistor 112 through a coupling condenser 126.

In operation, a selected fraction of the brightness signal ($W/3$) is supplied to tube 122 and the resultant signal is applied to the cathodes of tubes 105–107. The anode current of each of these tubes may be defined in terms of Equation 31 as $$\begin{aligned} i_R &= M(R'+C-K+W/3) \\ i_B &= M(R'+C-K+W/3) \\ i_G &= M(R'+C-K+W/3) \end{aligned}$$

or $$\left.\begin{aligned} i_R &= MR \\ i_B &= MB \\ i_G &= MG \end{aligned}\right\} \quad (33)$$

With reference now to FIGURE 6, the circuit there illustrated may be employed in the receiver of FIGURE 3 for deriving the third color-control signal from the two transmitted color-control signals. The output circuits of detectors or demodulators 49 and 50 are coupled to control grids 130 and 131 of electron tubes 132 and 133, and cathodes 134 and 135, together with cathode 136 of a third electron tube 137, are grounded through a common cathode output load resistor 138 which, together with its connecting leads, constitutes an impedance network cross coupling cathodes 134–136. Resistor 138 has a resistance value much greater than the inverse of the grid-plate transconductance of these tubes. Individual grid resistors are provided for tubes 132 and 133 and grid 139 of tube 137 is directly grounded. Anodes 140–142 of tubes 133, 137 and 132 are connected to a source of anode potential through individual anode output load resistors and are condenser-coupled with respective ones of the cathodes 60, 59, and 58.

Employing the same letter-terminology utilized in connection with the circuit of FIGURE 4, it is apparent that $$\left.\begin{aligned} E_R &= R' - K \\ E_B &= B' - K \\ E_G &= G' - K \end{aligned}\right\} \quad (34)$$

Substituting these values for $(E_R)$, $(E_B)$ and $(E_G)$ in Equation 25, that equation becomes $$K = Mr_k(R' + G') - 3Mr_kK \quad (35)$$

Equation 5 may be expressed as follows:

$$R' + G' = -B'$$

and employing this relationship in Equation 35

$$K = \frac{-B'}{(1/Mr_k) + 3} \quad (36)$$

Since $r_K >> 1/M$, $$K = -B'/3 \quad (37)$$

and since $i_B = ME_B$ $$i_B = MB'/3 \quad (38)$$

Thus, the blue color-control signal may be derived through the use of the red and green color-control signals. If the plate load of tube 137 is three times that of tubes 132 and 133, the factor (⅓) on the right-hand side of Equation 38 may be cancelled.

It may be possible to achieve the same function performed by tubes 132, 133 and 137 in the cathode-ray tubes 55–57 themselves. In that case, in order to compensate for the factor (⅓) of Equation 37, it may be necessary to use a phosphor in tube 56 (which would correspond to tube 137) of greater luminous efficiency than in the other tubes. Alternatively, the voltages on the various control electrodes of that tube or that electron gun may be adjusted to give that result.

While particular embodiments of the present invention have been shown and described, it will be obvious to those skilled in the art that changes and modifications may be made without departing from this invention in its broader aspects, and therefore, the aim in the appended claims is to cover all such changes and modifications as fall within the true spirit and scope of this invention.

I claim:

1. A color television receiver for utilizing a plurality of control signals collectively defining hue and color saturation of an image to be reproduced comprising: at least three electron-discharge devices individually including an anode, a cathode and a control electrode; a common cathode load impedance connecting each of said cathodes of said devices with a plane of fixed reference potential; means for applying said control signals between different ones of said control electrodes of said devices and said plane of fixed reference potential; individual anode-load impedances for said devices; and image-reproducing means coupled to said anode-load impedances.

2. A color television receiver for utilizing a plurality of control signals collectively defining hue and color saturation of an image to be reproduced comprising: at least three electron-discharge devices individually including an anode, a cathode and a control electrode and having a predetermined control electrode-anode transconductance; a common cathode impedance connecting each of said cathodes of said devices with a plane of fixed reference potential and having an impedance value large with respect to the reciprocal of said transconductance; means for applying said control signals between different ones of said control electrodes of said devices and said plane of fixed reference potential; individual anode-load impedances for said devices; and image-reproducing means coupled to said anode-load impedances.

3. A color television receiver for utilizing a plurality of control signals, collectively defining hue and color saturation of an image to be reproduced, and subject to contamination with the same spurious signal comprising: at least three electron-discharge devices, individually including an anode, a cathode and a control electrode and having a predetermined control electrode-anode transconductance; a common cathode impedance connecting each of said cathodes of said devices with a plane of fixed reference potential and having an impedance value large with respect to the reciprocal of said transconductance; means for applying said control signals between different ones of said control electrodes of said devices and said plane of fixed reference potential; individual anode-load impedance for said devices for deriving each of said control signals, free of said spurious signal; and image-reproducing means coupled to said anode-load impedances.

4. A color television receiver for utilizing a video signal representing brightness information derived by combining three primary color signals and for also utilizing a plurality of control signals collectively defining hue and color saturation of an image to be reproduced and individually representing the amplitude difference between one of said primary color signals and a portion of said video signal, said receiver comprising: at least three electron-discharge devices, individually including an anode, a cathode and a control electrode; a common cathode load impedance connecting each of said cathodes of said devices with a plane of fixed reference potential; means for applying said control signals between different ones of said control electrodes of said devices and said plane of fixed reference potential; means for applying said video signal to said cathode impedance to establish effective control electrode-cathode potentials for said devices corresponding to said primary color signals; individual anode-load impedances for said devices for deriving signals representing said primary color signals; and image-reproducing means coupled to said anode-load impedances for responding to said primary color signals.

5. A signal-translating circuit for deriving from two control signals a third control signal having such relationship that the instantaneous amplitude sum of the three signals is equal to zero comprising: three electron-discharge devices, individually including an anode, a cathode and a control electrode; a common cathode load impedance connecting each of said cathodes of said devices with a plane of fixed reference potential; a conductive connection extending between said control electrode of one of said devices and said plane of fixed reference potential; means for applying said two control signals between said control electrodes of the remaining two of said devices and said plane of fixed reference potential; individual anode-load impedances for said devices for respectively deriving an assigned one of said three control signals; and utilization means coupled to said anode-load impedances.

6. A signal-translating circuit for deriving from two control signals, a third control signal having such relationship that the instantaneous amplitude sum of the three signals is equal to zero, comprising: three electron-discharge devices, individually including an anode, a cathode and a control electrode and having a predetermined control electrode-anode transconductance; a common cathode impedance connecting each of said cathodes of said devices with a plane of fixed reference potential and having an impedance value large with respect to the reciprocal of said transconductance; a conductive connection extending between said control electrode of one of said devices and said plane of fixed reference potential; means for applying said two control signals between said control electrodes of the remaining two of said devices and said plane of fixed reference potential; individual anode-load impedances for said devices for respectively deriving an assigned one of said three control signals; and utilization means coupled to said anode-load impedances.

7. A color television receiver for utilizing a plurality of control signals collectively defining hue and color saturation of an image to be reproduced comprising: at least three electrode systems, individually including an anode, a cathode and a control electrode and having a predetermined control electrode-anode transconductance; a common cathode impedance connecting each of said cathodes with a plane of fixed reference potential and having an impedance value large with respect to the reciprocal of said transconductance; and means for applying said control signals between different ones of said control electrodes and said plane of fixed reference potential.

8. A signal-translating circuit for deriving from two control signals, a third control signal having such relationship that the instantaneous amplitude sum of the three signals is equal to zero, comprising: three electron-discharge devices, individually including an anode, a cathode and a control electrode and having a predetermined control electrode-anode transconductance; a common cathode impedance connecting each of said cathodes of said devices with a plane of fixed reference potential and having an impedance value large with respect to the reciprocal of said transconductance; a conductive connection extending between said control electrode of one of said devices and said plane of fixed reference potential; and means for applying said two control signals between said control electrodes of the remaining two of said devices and said plane of fixed reference potential.

9. A color television receiver for utilizing a video signal representing brightness information and for also utilizing a plurality of control signals collectively defining hue and color saturation of an image to be reproduced comprising: at least three electrode systems, individually including an anode, a cathode and a control electrode and having a predetermined control electrode-anode transconductance; a common cathode impedance connecting each of said cathodes with a plane of fixed reference potential and having an impedance value large with respect to the reciprocal of said transconductance; means for applying said video signal between said cathodes and said plane and fixed reference potential; and means for applying said control signals between different ones of said control electrodes and said plane of fixed reference potential.

10. A circuit for utilizing a plurality of signals comprising: at least three electrode systems, individually including an anode, a cathode and a control electrode and having a predetermined control electrode-anode transconductance; a common cathode impedance connecting each of said cathodes with a plane of fixed reference potential and having an impedance value large with respect to the reciprocal of said transconductance; and means for applying said signals between different ones of said control electrodes and said plane of fixed reference potential.

11. A circuit for utilizing a plurality of signals comprising: at least three electrode systems, each individually including an anode, a cathode, and a control electrode and having a predetermined control electrode-anode transconductance; a common cathode impedance connecting each of said cathodes with a plane of fixed reference potential and having an impedance value large with respect to the reciprocal of said transconductance; individual anode-load impedances connecting each of said anodes to said plane of reference potential; and means for applying said signals between different ones of said control electrodes and said plane of fixed reference potential.

12. A color-control-signal generator for a three-color television system including: three input terminals for individually receiving three different primary color signals; three electron discharge devices individually having anode, cathode and control electrodes, the control electrode of each of said devices being connected to one of said input terminals to receive an assigned one of said signals; three anode-load impedances individually connected to said respective ones of said anodes; a source of operating potential serially connected between each of said anode-load impedances and a reference potential plane; a common cathode-load impedance connecting said cathodes to said reference potential plane; and circuit connections from each of a plurality of anode-load impedances and from said cathode impedance to individual ones of said output terminals, whereby upon application of said three primary color signals to said input terminals at least two color-control signals and a brightness signal appear at said output terminals.

13. A color-control-signal generator for a three-color television system including: three input terminals for individually receiving three different primary color signals; three electron discharge devices having substantially identical operating characteristics and individually having anode, cathode and control electrodes, the control electrodes of each of said devices being connected to one of said input terminals to receive an assigned one of said signals; three anode-load impedances individually connected to respective ones of said anodes; a source of operating potential serially connected between each of said anode-load impedances and a reference potential plane; a common cathode-load resistor connecting said cathodes to said reference potential plane, said resistor having a resistance value large with respect to the inverse of the grid-plate transconductance of said electron discharge devices.

14. Matrixing apparatus for color-television signals comprising: means for supplying a pair of signals individually representative of unlike colors of an image; a plurality of electron-discharge devices each having at least a cathode, an anode, and a control electrode; means for applying said pair of signals individually to different ones of said control electrodes; means, including an impedance network cross coupling said cathodes, for developing from predetermined proportions of said applied signals at one of said cathodes another signal representative of another color; and a plurality of output circuits individually coupled to different ones of said anodes for developing in said output circuits output signals individually representative of different ones of three unlike colors of said image.

15. Matrixing apparatus for color-television signals comprising: means for supplying a pair of signals individually representative of unlike colors of an image; three electron-discharge devices each having at least a cathode, an anode, and a control electrode; means for applying said pair of signals individually to different ones of said control electrodes in a pair of said devices; means, including an impedance network cross coupling said cathodes in said pair of devices and connected to said cathode in the third of said devices, for developing from predetermined proportions of said applied signals at said cathode in said third of said devices another signal representative of another color; and a plurality of output circuits individually coupled to different ones of said anodes for developing in said output circuits output signals individually representative of different ones of three unlike colors of said image.

16. A color-television receiver for utilizing a plurality of color control signals collectively defining hue and color saturation of an image to be reproduced and individually representing an amplitude difference between a primary color signal and a portion of a luminance signal representing brightness of said image with said color control signals being subject to contamination by a common spurious signal, said receiver comprising: at least three electron-discharge devices individually including an anode, a cathode and a control electrode; input and output circuits coupled individually to said devices; means for applying said color control signals to different ones of said input circuits; individual output load impedances in each of said output circuits; image-reproducing means coupled to said output load impedances; and a load impedance commonly coupled into the input and output circuits of all of said devices, the value of said load impedance being sufficient to effect substantial cancellation of said common spurious signal.

17. In a color television transmitter in which a plurality of primary color signals representative of a scanned image are developed, the combination comprising: at least three electrode systems individually including an anode, a cathode and a control electrode and having a predetermined control electrode-anode transconductance; a common cathode load impedance connecting each of said cathodes with a plane of fixed reference potential and having an impedance value large with respect to the reciprocal of said transconductance; means for applying said signals between different ones of said control electrodes and said plane of fixed reference potential; and modulated-carrier signal-transmitting means coupled to the anodes of said electrode systems.

18. In a color television receiver adapted to utilize first and second color-representative signals representative of different color components of an image, the combination comprising: first and second active electron devices each having input, output, and common electrodes; means for respectively applying said first and second color-representative signals to the input electrodes of said first and second active electron devices; and means, including a common output load coupled to the common electrodes of said first and second active electron devices and a third active electron device coupled to said common output load, for adding selected amplitudes and polarities of said first and second color-representative signals to develop at least three color-representative signals, at least one of which is developed in said common output load and is different than either of said first and second color-representative signals, collectively defining the hue and color saturation of said image.

19. In a color television receiver adapted to utilize first and second color-representative signals representative of different predetermined color components of an image, the combination comprising: an active electron device having an input electrode, an output electrode, and a common electrode; first and second output loads coupled respectively to said output electrode and to said common electrode and adapted to develop output signals of different polarities in response to application of an input signal to said input electrode; means for applying said first color-representative signal to said input electrode to develop color-representative signals of different polarities in said first and second output loads respectively; and means for generating an additional color-representative signal representative of a color component of said image different than either of said predetermined color components, said generating means comprising means for applying said second color-representative signal to said second output load for combination with the color-representative signal developed therein in response to application of said first color-representative signal to said input electrode.

20. In a color television receiver, the combination comprising: a source of a first color-representative signal representative of a first color component of an image; a source of a second color-representative signal representative of a second and different color component of said image; and means, including a pair of active electron devices having input electrodes respectively coupled to said sources and also having output and common electrodes, a passive output load coupled to the common electrodes of said pair of active electron devices, and a third active electron device coupled to said passive output load, and at least partially responsive to said first and second color-representative signals, for developing three different color-representative signals, at least one of which is different than either of said first and second color-representative signals, collectively defining the hue and color saturation of said image.

21. In a color television receiver, the combination comprising: means including a first demodulator for developing a first color difference signal representative of a first color component of an image; means including a second demodulator for developing a second color difference signal representative of a second and different color component of said image; and means, including first and second amplifiers having input electrodes coupled respectively to said first and second demodulators and further having output electrodes respectively coupled to separate output loads and common electrodes each coupled to a common output resistor, and a third amplifier coupled to said common output resistor, and at least partially responsive to said first and second color difference signals, for developing three separate and different color-representative signals, at least one of which is different than either of said first and second color difference signals.

22. In a color television receiver for utilizing a composite color video signal, the combination comprising: demodulator means at least partially responsive to said composite color video signal for developing first and second color difference signals representative of different predetermined color components of an image; first and second amplifier devices each having a control electrode, an output electrode and a common electrode; means coupled to said demodulator means for respectively applying said first and second color difference signals to the control electrodes of said first and second amplifier devices; a common output load including a resistor coupled to the common electrodes of both of said first and second amplifier devices; a third amplifier device having a control electrode, an output electrode and a common electrode; a plane of fixed reference potential; means coupling said resistor between the common electrode of said third amplifier device and said plane of fixed reference potential; means coupling the control electrode of said third amplifier device to said plane of fixed reference potential; and means including separate output loads respectively coupled to the output electrodes of said first, second and third amplifier devices and at least partially responsive to said first and second color difference signals for developing three different color-representative signals, each different than either of said color difference signals, collectively defining the hue and color saturation of said image.

23. In a color television receiver adapted to utilize a luminance signal representative of the brightness of an image and first and second color difference signals representative of different predetermined color components of said image and each having a brightness component, the combination comprising: first and second amplifiers each having a separate output load and an input circuit and both having a common load; means for applying said first and second color difference signals to the input circuits of said first and second amplifiers respectively; a third amplifier having a separate output load and having an input circuit coupled to said common output load; and means for applying said luminance signal to said first, second and third amplifiers to matrix therein with the color difference signals developed thereby in response to the application of said first and second color difference signals to said first and second amplifiers and to develop in the separate output circuits of said first, second and third amplifiers respectively three different color-representative signals, each of which is different than either of said first and second color difference signals and at least one of which is representative of a different color component of said image than either of said predetermined color components.

References Cited by the Examiner

UNITED STATES PATENTS

| | | | |
|---|---|---|---|
| 2,221,398 | 11/40 | Geohegan | 179—171 |
| 2,233,317 | 2/41 | Konkle | 178—6 |
| 2,240,420 | 4/41 | Schnitzer | 178—6 |
| 2,412,279 | 12/46 | Miller | 178—6 |
| 2,435,331 | 2/48 | Street | 179—171 |
| 2,490,561 | 12/49 | Ussler | 178—7.2 |
| 2,566,707 | 9/51 | Sziklai | 178—5.4 |

(Other references on following page)

UNITED STATES PATENTS

| | | | |
|---|---|---|---|
| 2,559,843 | 7/51 | Bedford | 178—5.4 |
| 2,632,046 | 3/53 | Goldberg | 178—5.4 |

OTHER REFERENCES

Fink: "Television Engineering Handbook"; McGraw-Hill Book Company, Inc., 1957, page 9–4 cited.

IRE Dictionary of Electronic Terms and Symbols, New York Institute of Radio Engineers, Inc., 1961, pp. 83 and 95 relied on.

An Analysis of the Sampling Principles of the Dot-Sequential Color Television System, R.C.A. Review, June 1950, pages 255–286 relied on.

Hirsch et al.: Principles of N.T.S.C. Compatible Color Television, Electronics, February 1952, pages 88–95 relied on.

DAVID G. REDINBAUGH, *Primary Examiner.*

NEWTON N. LOVEWELL, *Examiner.*